United States Patent [19]

Christenson et al.

[11] Patent Number: 4,924,434

[45] Date of Patent: May 8, 1990

[54] SHARING WORD-PROCESSING FUNCTIONS AMONG MULTIPLE PROCESSORS

[75] Inventors: Patrick J. Christenson; Robert J. Hart; David C. Naatz, all of Rochester; Edward J. Rowlance, Stewartville; David G. Wenz, Rochester, all of Minn.

[73] Assignee: International Business Machines Corporation, Armonk, N.Y.

[21] Appl. No.: 196,833

[22] Filed: May 9, 1988

Related U.S. Application Data

[63] Continuation of Ser. No. 787,235, Oct. 15, 1985, abandoned.

[51] Int. Cl.$^5$ .................... G06F 15/16; G06F 3/153
[52] U.S. Cl. ................ 364/900; 364/943.43; 364/975.1; 364/942.5; 364/949.91
[58] Field of Search ... 364/200 MS File, 900 MS File, 364/131, 132, 136, 137; 400/63, 76, 83

[56] References Cited

U.S. PATENT DOCUMENTS

| | | | |
|---|---|---|---|
| 4,231,087 | 10/1980 | Hunsberger et al. | 364/200 |
| 4,462,701 | 7/1984 | Czyszczewski et al. | 364/900 X |
| 4,464,730 | 8/1984 | Lawrence et al. | 364/900 |
| 4,503,499 | 3/1985 | Mason et al. | 364/200 |
| 4,530,051 | 7/1985 | Johnson et al. | 364/200 |
| 4,589,068 | 5/1986 | Heimen, Jr. | 364/300 |
| 4,633,430 | 12/1986 | Cooper | 364/900 |
| 4,731,750 | 3/1988 | Hoflich et al. | 364/900 |
| 4,734,564 | 3/1988 | Boston et al. | 235/380 |

Primary Examiner—Thomas C. Lee
Attorney, Agent, or Firm—B. A. Forest; J. M. Anglin; Joseph J. Kaliko

[57] ABSTRACT

A central processor holds a word-processing program and an entire document to be processed. A smaller I/O processor, connected to the central processor and to an interactive display, holds code for some functions of the word processor, and holds a part of the document. As an operator performs editing tasks at the display, the I/O processor performs locally those functions involving only the document part it holds. When additional document text is required to complete a function, the central processor performs that part of the function involving the additional text.

13 Claims, 8 Drawing Sheets

SHARING WORD-PROCESSING FUNCTIONS AMONG MULTIPLE PROCESSORS

This is a continuation of co-pending application Ser. No. 787,235 filed on Oct. 15, 1985, now abandoned.

BACKGROUND OF THE INVENTION

The present invention concerns electronic data processing, and more particularly concerns a method for sharing the execution of a function among multiple processors when one of the processors has insufficient data to execute the function alone.

Word processing took a giant leap with the advent of microprocessor-based dedicated word processors and personal computers. Previous mainframe-based text processing programs, lacking a wide bandwidth between memory and text display on a terminal, and requiring time-sharing the program among multiple users, could not attain enough speed for a real-time "wysiwg" (what you see is what you get) type word processor (WP). Presently available personal computers and dedicated word processors do successfully implement this type of WP for a single user, and their use is widespread.

However, in many cases it is desirable to house high-speed word processing programs in multiple-user minicomputers, for example. The cost of a minicomputer with terminals serving each person in a department is much less than the cost of providing individual personal computers and programs for each person, and has other advantages such as central storage of departmental records. The incremental cost of providing word processing (WP) on such a minicomputer would be low; but speeds are still not nearly high enough to provide the kind of WP functions people have come to expect from single-user machines.

SUMMARY OF THE INVENTION

The present invention provides a method of implementing word-processing and other programs requiring high-speed interaction with a display and involving large amounts of data.

The method employs a processing system having multiple processors. A central processor (CP) is capable of operating directly upon a large data entity such as an entire document, but its code is shared among all operators. An input/output processor (IOP) interacts directly with each operator's display in real time, but it can store only a limited amount of data, perhaps only a small portion of that operator's document. Broadly speaking, the IOP executes functions of the program upon such data as is available to it in a local storage. Whenever a function requires a larger block of data, the IOP requests the CP to perform a part of the function on the data not directly available to the IOP. Typically, the IOP processes as much text as can be displayed to a user at one time on a terminal, while the CP operates on an entire document. The functions include such things as locating the occurrence of designated characters in a document ("locate", "search", etc.) and processing specified blocks of characters as a unit ("delete", "move", etc.).

DESCRIPTION OF PREFERRED EMBODIMENT

Figure 1:
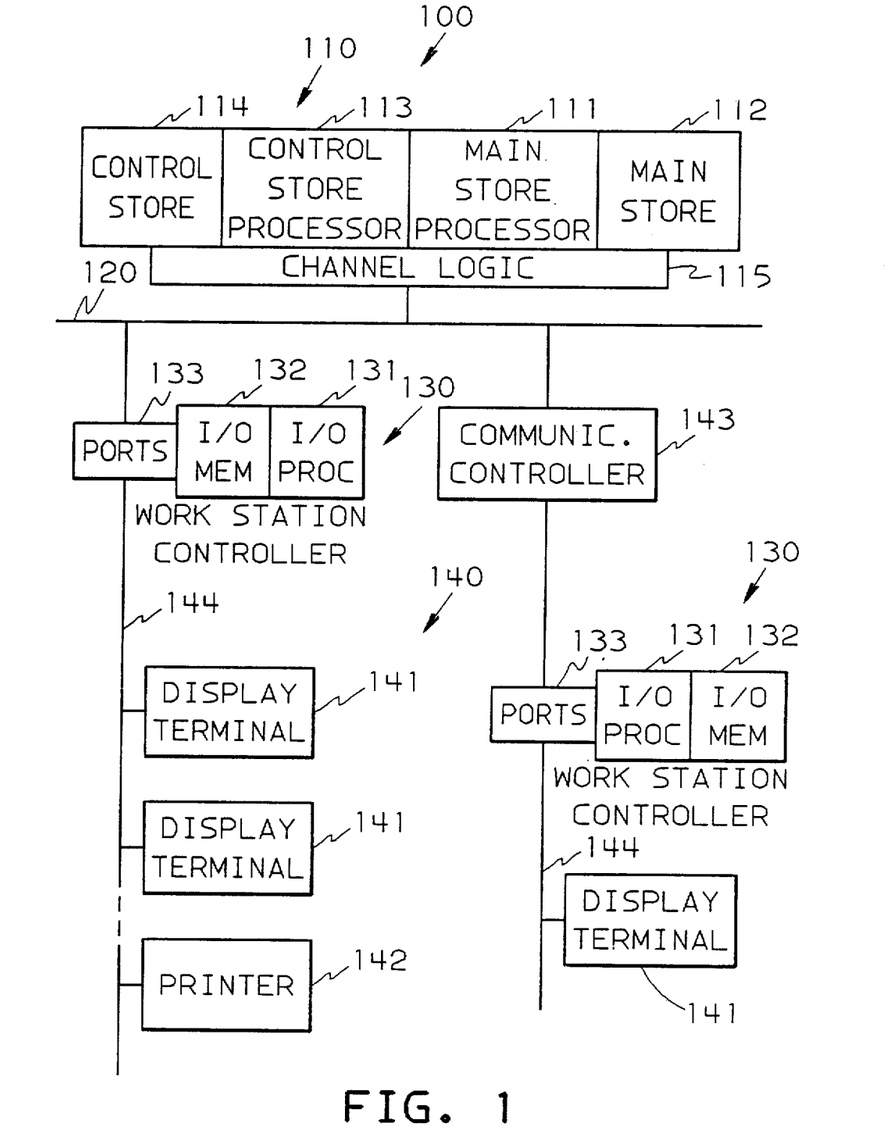
FIG. 1 is a high-level diagram of a data-processing system upon which the invention can be carried out.

FIG. 1 shows a publicly available IBM System/36 data processor 100 which may serve as an environment for the present invention. Briefly, central processor 110 includes main-store processor (MSP) 111 for executing application programs from read/write main store 112, which also holds data of various kinds. Control-store processor (CSP) 113 executes low-level operating-system tasks from read/write control store 114. CSP 113 controls channel logic 115 for transferring data at high speed to and from channel bus 120. Different types of input/output (I/O) device controllers attach to channel bus 120. The controllers pertinent to the invention are the workstation controllers (WSCs) 130 for interfacing workstation terminals 140 such as interactive alphanumeric displays 141 and printer 142. Controllers 130 may be attached locally to bus 120 or remotely by a communications controller 143. Central processor 110 and WSCs 130 communicate with each other via a conventional data stream having a series of frames carrying various commands and parameters for transferring control information and the contents of display screens. Normally, central processor 110 acts as a master processor, while WSC 130 acts as a slave. That is, processor 110 sends commands to WSC 130, which executes program modules to carry out the commands, then returns responses to processor 110 via the data stream. The responses may include attention identifiers (AIDs) indicating depression of some terminal keys by the operator.

Display terminals 141 may be publicly available products such as the IBM 5250 Model 11, IBM 5291, IBM 5292, or IBM 3180 Model 2 Workstation Terminals, which communicate with controllers 130 by a multi-drop cable 144. Each controller 130 includes an I/O processor (IOP) 131, an I/O memory holding data and program code for IOP 131, and a bus coupler 133 having ports for transferring data via I/O processor 131 between I/O memory 132 and bus 120, and between memory 132 and cable 144. The conventional function of processor 131 is to execute programs residing in memory 132 for converting high-function data streams received from CP 110 into simpler, more basic commands that can be understood by dependent terminals 141, and vice versa. In other processor organizations, controller 130 might be a physical part of an intelligent terminal, rather than being located with the central processor or in its own enclosure as a freestanding unit.

Figure 2:
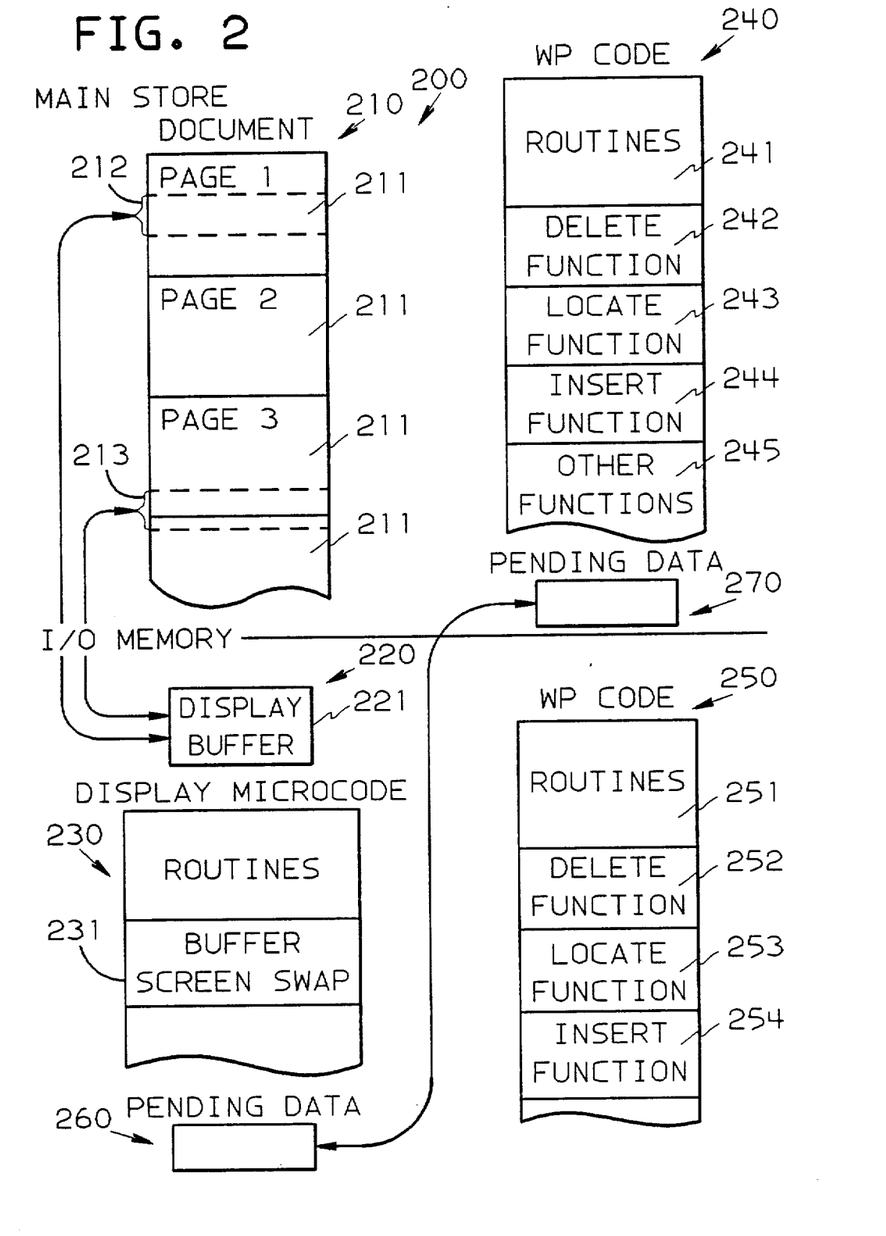
FIG. 2 shows the memory locations of data and code used in the invention.

FIG. 2 is a memory map 200 illustrating how the invention divides the WP code for improved processing. Main store 112, FIG. 1, holds an entire document 210 to be processed. (Part of the document may physically reside on a disk file, but this is transparent to the invention.) This document may be divided into pages 211. At any given time, one block 212 of the document resides in a buffer 220 defined in memory 132 of controller 130. Actually, this buffer holds only a single line of data for each terminal connected to its cable 144; a refresh buffer (not shown) in each terminal 141 holds the full screen currently being displayed, and is updated when necessary from buffer 220. This implementation detail, however, is transparent to the invention; for description purposes, data 221 in buffer 220 will be treated as though it contained the entire screen currently being displayed. When WSC 130 requires more data from document 210 to continue processing, swap routine 231 of WSC microcode 230, stored in IOP 131, transmits the buffer contents back to block 212; then it receives another block 213 as new data 221 in buffer 220. WSC 130 has no direct access to main store 112; processor 110 likewise has no access to I/O memory 132, nor to the refresh buffer in terminals 141. These and other transfers between buffer 220 and document 210 are actually carried out via the data stream between the two processors. For example, WSC executes microcode to access buffer 221 in its addressable memory 132, packages the buffer contents in data-stream frames, and transmits them to central processor 110. Processor 110 receives and decodes the frames, and writes the data to the appropriate addresses in main store 112.

Although the data stream is a conventional part of the publicly available IBM System/36, a brief overview of the CP-to-WSC communication is helpful in understanding how the data relevant to the invention is actually transported in this embodiment of the invention. A communication begins when CP 110 sends an interrupt to WSC 130 over channel 120. This is controlled by a program running in CSP 113 dedicated to running the workstation subsystem, and occurs when an application program executing in MSP 112 issues a command to a display or when the CSP program itself has nothing else to do and issues an "Invite" command to determine whether new data is available or needed. WSC 130 responds to the interrupt by requesting a Workstation Control Field (WSCF) from a known location in MS 112 by a cycle-steal (direct memory access, or DMA) transfer via channel 120. (Cycle-steals are mediated by CSP 113, which can address data in main store 112 directly.) The WSCF may be a command such as "Read Screen", having an operation code, a display identifier, and a maximum byte count.

WSC 130 decodes the WSCF, and initiates the transfer of a data-stream frame to carry out the request. They vary greatly in length, from 8 bytes to more than 12,000 bytes. Each frame contains an escape character and a command byte. The command byte specifies the format of the rest of the frame. Frames relevant to the invention may have two bytes specifying the entire frame length, class and type bytes encoding the interpretation to be accorded the subsequent data, one or more flag bytes, and the data from the screen. This data itself may be structured or formatted into records representing display lines, each line having a flag byte and a length byte.

WSC 130 sends the formatted data-stream frame over channel 120 by cycle-steal into main store 112. The WSC then returns the WSCF back to its location in main store with a completion code, and issues an interrupt to CSP 113 of CP 110. The workstation-subsystem program then reads the WSCF and decides what to do next. This procedure, and the data-stream contents, varies from one model of data processor to another, and may be carried out in many different ways within the concept of the invention.

In the present invention, IOP 130 also stores and executes a part of the code for a WP, an application program which would conventionally be executed by central processor 110 in MSP 111 as a single program residing in main store 112. WP code 240 located in main store 112 contains main routines 241 and individual functions such as a delete function 242, a character-locate function 243, continuous-insert function 244, and other functions 245. WP code 250 stored in I/O memory 132 contains auxiliary routines 251 and portions of some of the same functions—the "shared functions"—located in the main store. A Pending Data table 260 in I/O memory contains items for coordinating the execution of these functions. An image of table 260 is maintained in an area 270 of main store 112. The image is updated by transmitting table 260 to main store 112 in the data stream whenever CP 110 reads the display screen; correspondingly, table 260 is updated from the data in area 270 whenever CP 110 writes a display screen to WSC 130. The relevant data in table 260 is shown in the table below.

| Field Name | Length (bytes) | Bit No. | Description |
|---|---|---|---|
| Flags | 2 | 0 | Insert mode is on for this display |
| | | 1. | Locate mode is on for this display |
| | | 2 | An active Copy, Move, or Delete operation was completed, and CP had requested notification |
| | | 3 | An active Copy, Move or Delete was cancelled, and CP had requested notification |
| | | 4 | A Delete is now active |
| | | 5 | A Copy is now active |
| | | 6 | A Move is now active |
| | | | (Remaining bits not relevant) |
| Displaced Characters | 3 | | (Not relevant) |
| Start | 4 | — | Position of first character in a Copy, Move, or Delete operation |
| Locate | 1 | — | Character code to be located during a CP-assisted Locate operation |

The specific shared functions to be described as examples herein are the delete, character-locate, and insert functions, whose auxiliary code in I/O memory 132 is labelled 252-254 respectively.

Figure 3:
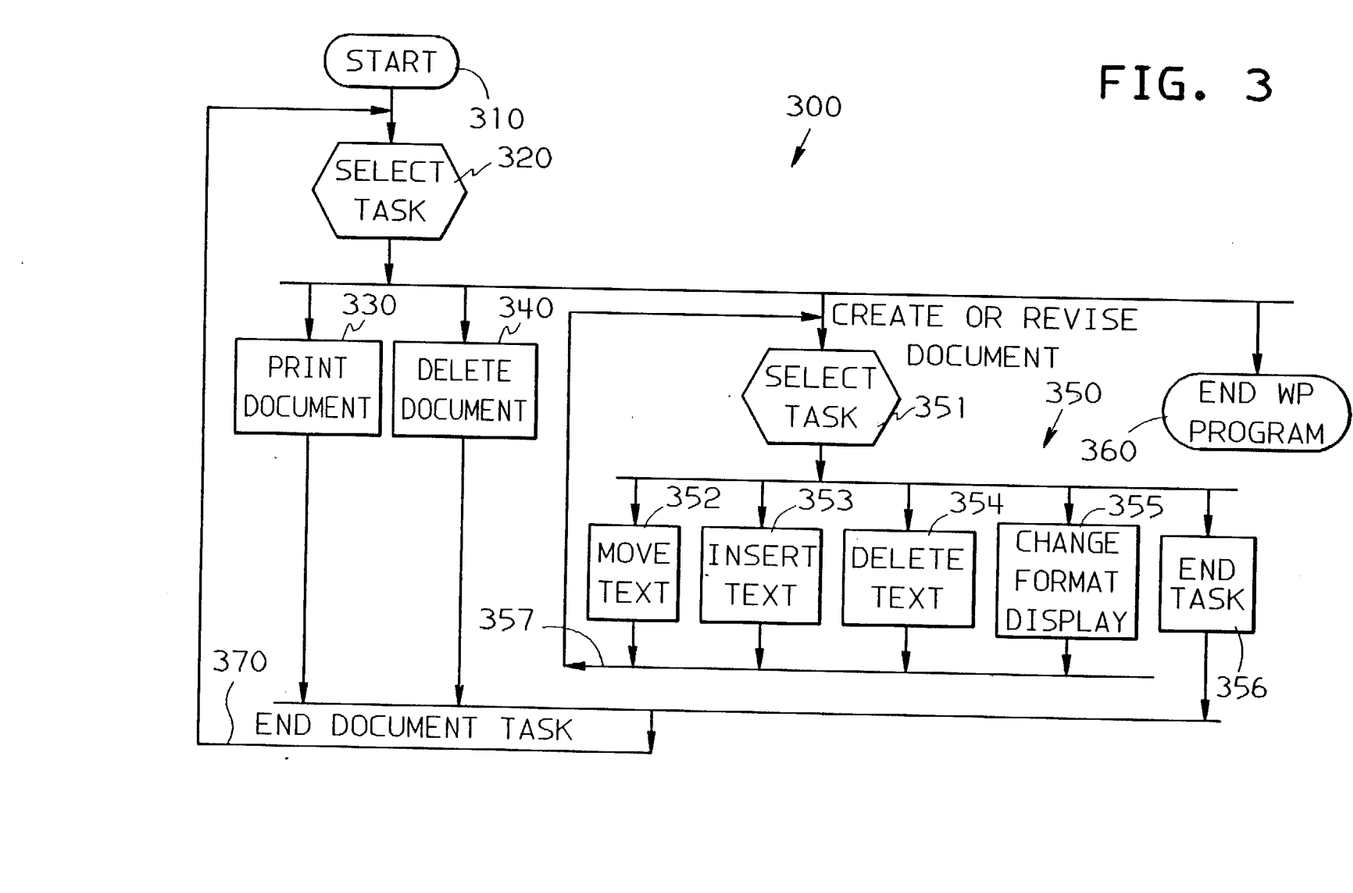
FIG. 3 is a high-level flowchart of a word-processor program in which the invention can be implemented.

FIG. 3 is a high-level flow diagram of a program 300 for executing the main routines of the IBM Display-Write/36, a word processor 241 which operates in accordance with the invention. Program 300 runs in central processor 110; more specifically, it is stored in main store 112 and is executed by MSP 111, FIG. 1. After starting 310, the program requests 320 the operator to select a task, such as printing 330, deleting a document 340, editing 350 (creating or revising) a document, or ending 360 the WP program. When the selected task has finished, control returns 370 to block 320 for another selection.

Within each task, the operator may select individual functions to be performed, perhaps to multiple levels of detail. While editing document text, for example, block 351 displays a screen 221 of document 210. The operator may press keyboard keys to select any one of a number of functions for manipulating characters in the document. These functions include such things as moving 352, copying 353, and inserting 354 text characters, changing 355 the format of the text, and ending 356 the editing function.

A number of functions in program 300 use the shared-function concept of the invention.

Figure 4:
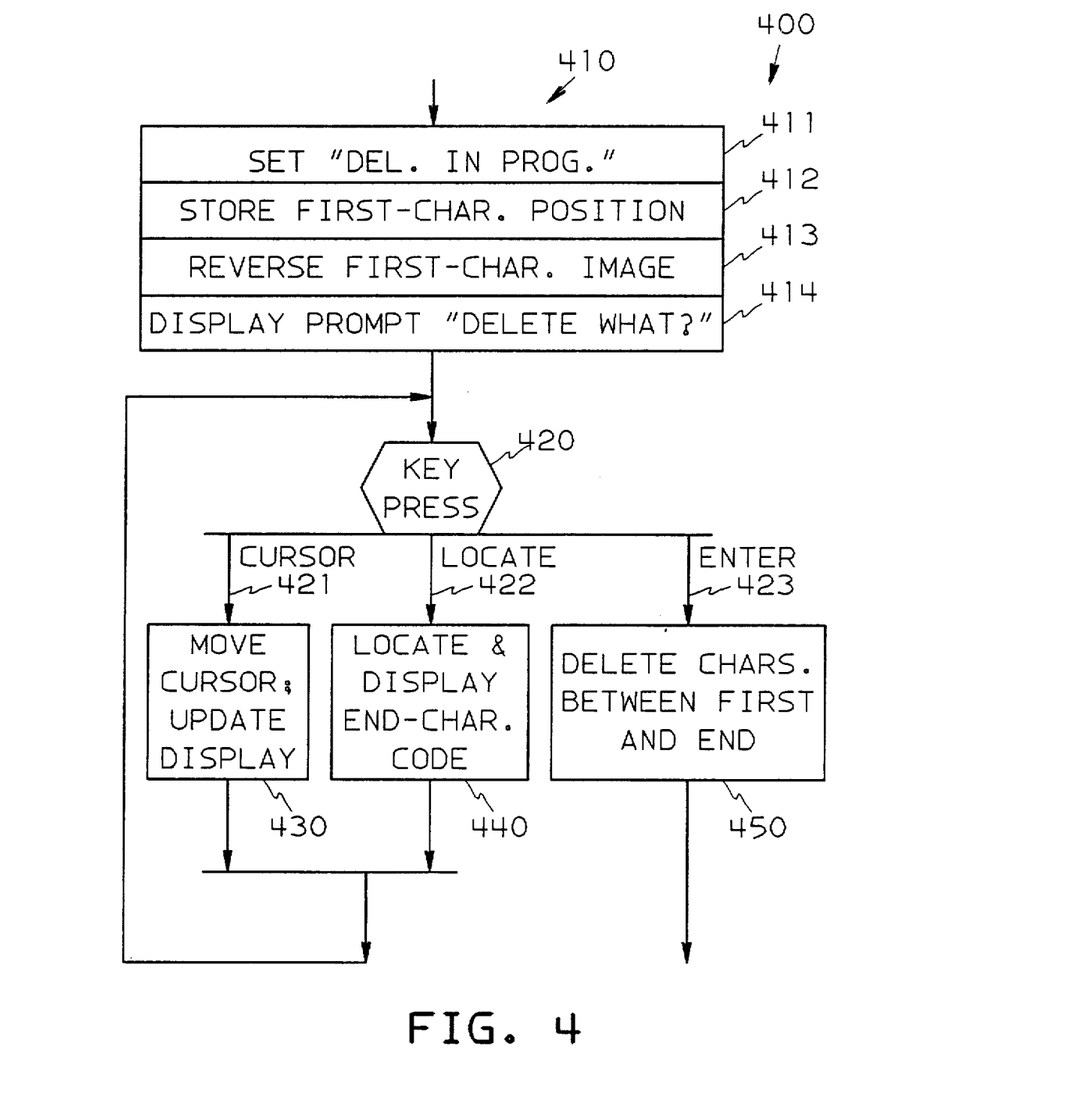
FIG. 4 is a flow chart of a "block delete" operation according to the invention.

FIG. 4 is a flow chart of a program module 400 detailing the operation of the delete function 354, FIG. 3, as one example of how to implement a shared function according to the invention. Program 400 runs in WSC 130; that is, it is stored in I/O memory 132 and executed by I/O processor 131. (It can be downloaded from a disk at initial program load time.) Program 400 begins when the operator presses a "Delete" key at the terminal.

Blocks 410 set up the function. The code sets 411 a "Delete-Active" bit in table 260, bit 4 in the FF field in the above table, stores 412 the location of the first character in the block (i.e., the cursor location), in the "Start" field, changes 413 the attribute of the first character to reverse-video, and displays 414 a prompt such as "DELETE WHAT?" on the screen, requesting the operator to specify the location of the last character in the block. The operator may then press 421 a cursor key to move the cursor to another character. Block 430 then moves the current cursor location. Alternatively, the operator can press 422 a character key on the keyboard, causing block 440 to locate the next occurrence of that character in the document, starting from the current cursor location. After either block 430 or 440 has finished, control returns to selection block 420. That is, any combination of the two methods 430-440 can be used in any order to define a single block to be deleted. The remaining alternative from selection 420 occurs when the operator presses 423 the Enter key, signifying that the present cursor position locates the end of the block. Code 450 then deletes all characters between the stored first-character location and the current cursor position, and updates the display.

Figure 5:
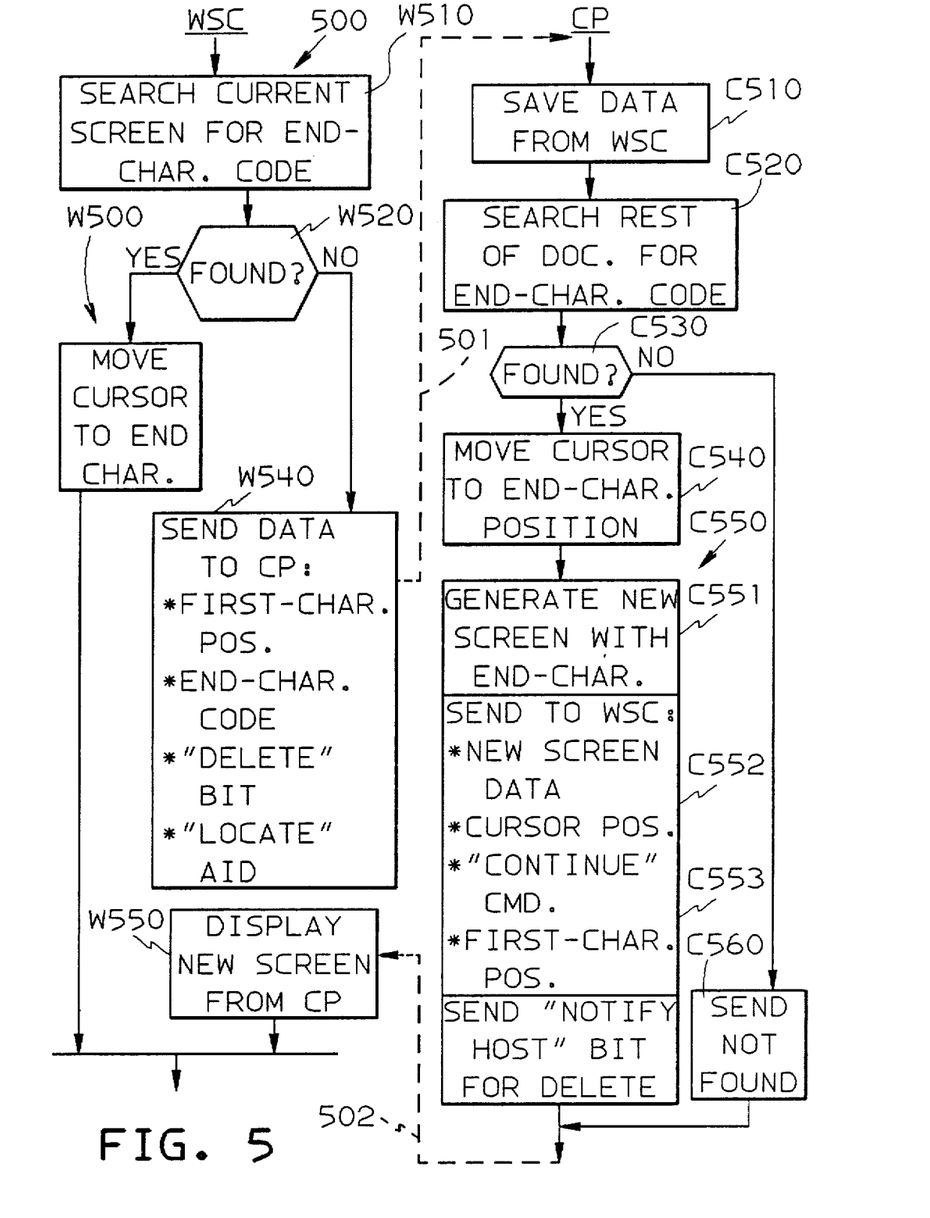
FIG. 5 details the "character locate" function of FIG. 4.

FIG. 5 is a flow chart 500 showing how the execution of block 440, FIG. 4, is shared between IOP 131 of workstation controller 130 and MSP 111 of central processor 110, FIG. 1. In FIG. 5, the steps executed in WSC 130 are prefixed with a "W", while those executed in CP 110 carry a "C". When keypress 422 activates character-locate function 440, FIG. 4, block W510 searches the current screen 221 (stored in I/O memory 132) for the keycode of the pressed key between the current cursor location and the end of the screen. If block W520 finds this code, block W530 carries out the locate function by moving the cursor to the end-character location. In this case, the entire locate function is executed in WSC 130, without any involvement of CP 110, which can thus execute other tasks at the same time, without interruption.

But, if W520 does not find the desired character code by the end of the current screen, block W540 requests CP 110 to carry out the locate function. Specifically, block W540 sends the pending-data table 260 to CP 110 in a data-stream frame, and also sends a host-assisted-locate attention identifier (AID) indicating that the locate function is to be carried out. Code C510 saves the contents of table 260 in an area 270 of main store 112. CP 110 then searches C520 the remainder of document 210 for the specified character code. When block C530 finds the character code, block C540 completes the locate function by moving the cursor to the end-character code. Blocks C550 return updated data 270 to WSC 130. Block C551 generates a new buffer-full of characters 211 containing the end character, with the cursor located under the end character. As soon as the character has been found, block C552 transmits, via the data stream, to WSC 130:

(a) data for the new screen of characters 213;
(b) a command specifying the position of the cursor on the located character within that screen;
(c) turning on the "Locate" bit in table 270;
(d) a new position for the first character in table 270;
(e) turning on the "Notify Host" bit for delete, bit 4 of field Flag1 in table 270.

If block C530 should not find the specified end character in the remainder of document 210, block C560 merely writes a message such as "CHARACTER NOT FOUND" on the current screen to WSC 130 via the data stream.

Line 502 indicates the transmission of the new data back to WSC 130. Block W550 then receives and stores the new screen and cursor location for display in terminal 141.

The following table details the contents of area 270 in MS 112, FIG. 1.

| Field Name | Length (bytes) | Bit No. | Description |
|---|---|---|---|
| Flag 1 | 1 | 0 | Set Insert mode off/on for this display |
| | | 1 | Set Locate mode off/on for this display |
| | | 2 | Execute Delete operation in WSC/CP |
| | | 3 | (Not relevant) |
| | | 4 | Don't/do notify CP when current active Copy, Move, or Delete operation is completed or cancelled |
| | | 5-7 | (Not relevant) |
| Flag 2 | 1 | 0 | Allow/prohibit Copy, Move, or Delete operation |
| | | 1-7 | (Always OFF) |
| Displaced Characters | 3 | — | (Not relevant) |
| Start Loc | 4 | — | Row-column location of start of a Move, Copy, or Delete operation |

Figure 6:
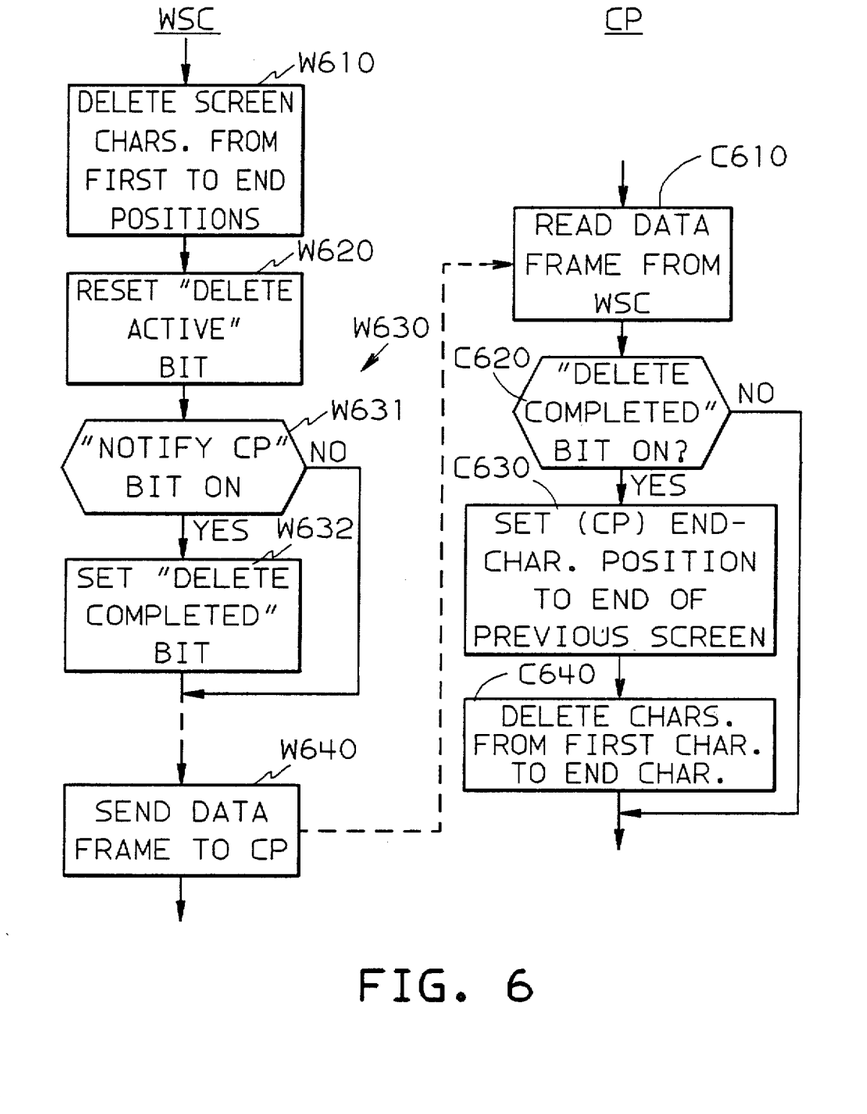
FIG. 6 details the "delete characters" function of FIG. 4.

FIG. 6 is a flow chart 600 of delete function 450, showing what happens when the operator presses the "Enter" key after having defined the block of characters to be deleted. Again, blocks executed by WSC 130 are prefixed by "W"; a "C" denotes blocks executed by CP 110.

Block W610 deletes the characters in the current screen 221 from the displayed first-character position to the end-character position marked by the cursor. As previously described, the first-character position is the actual beginning of the delete block if the current screen is the same as the screen in which the delete operation was started. Otherwise, the first-character position is the first character in the current screen: i.e., the screen in which the delete operation ends. WSC 130 then resets the "Delete Active" bit (Flags bit 4 of buffer 260) in block W620. Blocks W630 synchronize the function sharing if necessary. If the "Notify CP of Delete Completion" bit (Flags1 bit 4 of buffer 270) is ON in block W631, block W632 sets the "Delete Completed" bit (Flags bit 2 in buffer 260); this bit had been set in block C552, FIG. 5 if the operation was seen to span multiple screens. At a later time, block W640 transmits a data frame to CP 110. The frame includes data table 260; as mentioned above, tables 260 and 270 are updated from each other's data every time a screen is read from WSC 130 or written to CP 110.

WSC 130 then exits to block 450, FIG. 4, which in turn exits block 354, FIG. 3.

When CP 110 later reads C610 the data frame sent by W640, it checks C620 for the "Delete Completed" bit (Flags bit 2 in buffer 260). If this bit is on, block C630 repositions the end-character location to a position in document 210 just before the first character of the current screen. This is done by changing the "Start Location" field in buffer 270. Block C640 deletes all characters in document 210 from the stored (in buffer 270) first-character location in screen 212 to the (new) end-character location.

MSP 111 of CP 110 then continues with other tasks, such as display requests for other documents. These tasks might or might not be connected with the present invention.

Thus, if the delete operation spanned more than one screen of text, it is shared between the two processors: WSC 130 deletes the characters on its current screen, while CP 110 deletes the remaining characters directly in document 210. But, if only the current screen is involved, CP 110 does not share the deletion operation, and WSC 130 performs the entire task. In either case, all characters changed in the current screen will be updated in document 210 at a later time, whenever CP 110 requests a screen read.

Another function shared between WSC 130 and central processor 110 is that of continuous insertion of new display lines as needed for text-character entry. The normal mode in which the word processor enters new characters into a document is to insert them at the cursor location, pushing all characters to the right of the cursor on the same line one position to the right as each new character is displayed. When the line becomes too long—that is, when a non-null character enters the right-margin column—these characters of the rightmost word are moved into a new line, and other lines are scrolled up or down on the display to make room for the new line. This function appears as block 353 in FIG. 3, and is executed whenever the operator is entering text and has not invoked some other task such as moving or deleting characters.

Figure 7A:
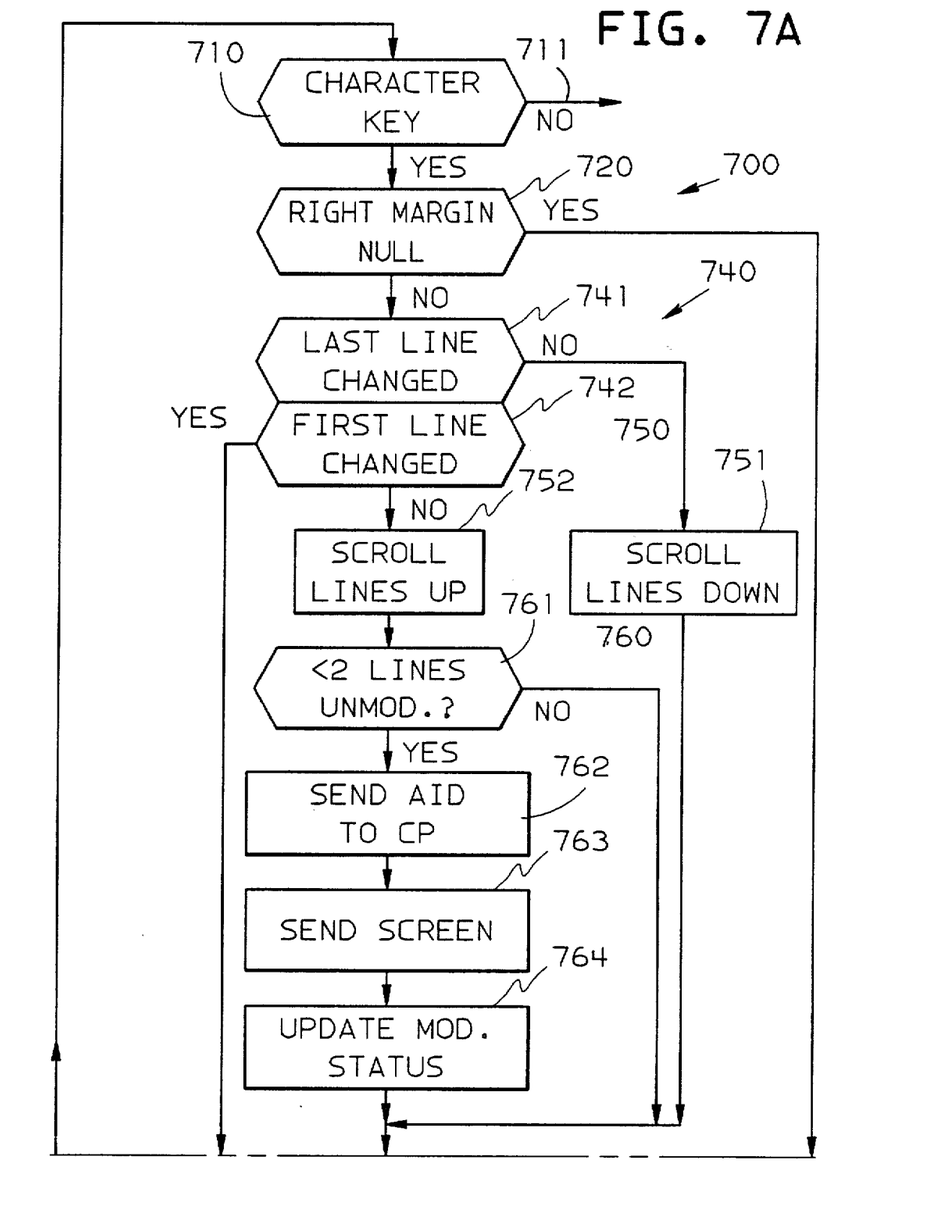
FIGS. 7A and 7B, detail a flow chart of the "continuous insert" operation according to the invention.
Figure 7B:
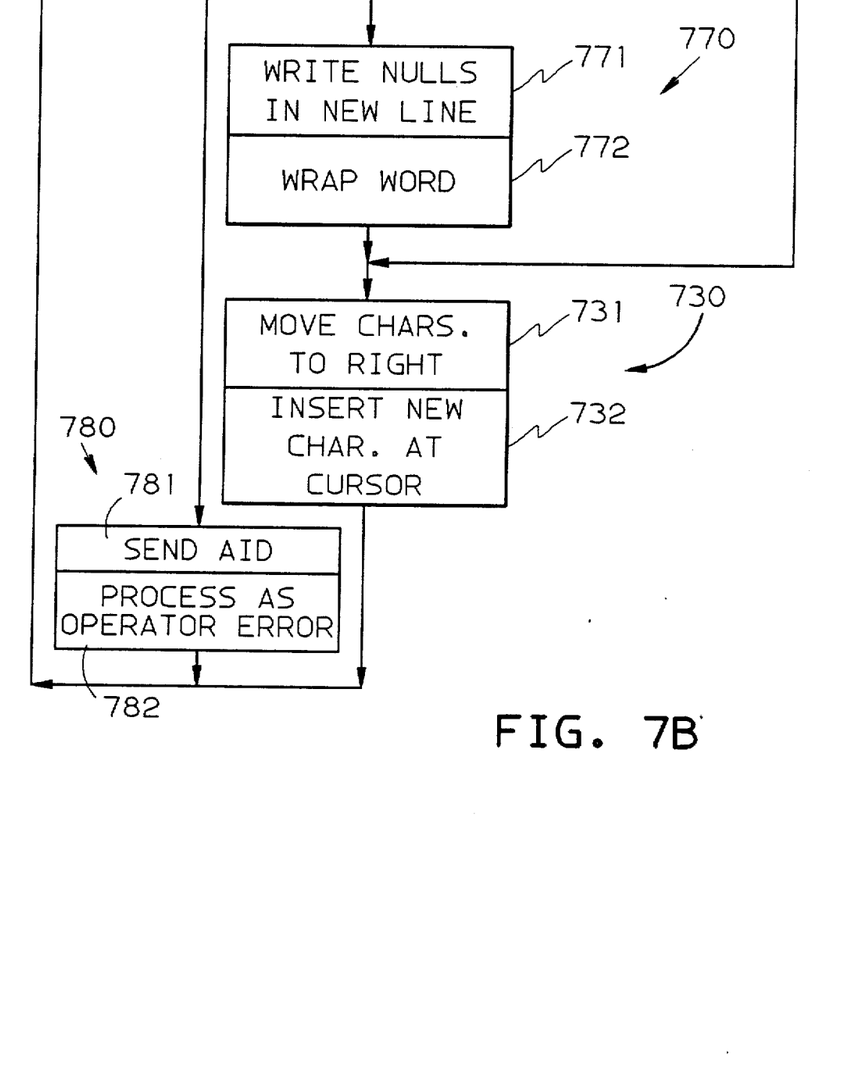

FIG. 7 represents code 700 for sharing the insert function between the two processors. This code is a WSC 130 module; that is, the code resides in memory 132 and is executed by processor 131.

When the operator presses a character key at 710 to insert new characters at the cursor position in an existing line, block 720 decides whether or not a new display line is required. If the existing line contains only null characters between its rightmost character and the right margin column, control passes immediately to blocks 730. These blocks merely make room in the existing line for the character to be inserted. Block 731 moves the characters from the cursor location one space to the right; block 732 inserts the new character in the space thus opened up at the cursor location.

If the existing line is already full (no null at the right margin), a new line must be inserted below the cursor position. Blocks 740 determine which way the existing display lines will be scrolled 750 to make room for the new line. If block 741 finds that the last (lowermost) text line on the display has not been modified since the present screen was displayed, block 751 scrolls downward all the lines below the cursor position, pushing the last line off the screen. No information is lost, because the same up-to-date data is contained in portion 212 of document 210 in MS 112. Blocks 770 then prepare the new line. Block 771 overwrites all the characters in the line immediately below the cursor with null characters. Block 772 word-wraps the last word the cursor line; that is, the entire word having its rightmost character in the right-margin column is moved to the new line. Blocks 730 then insert the new character as previously described.

If the last display line has been changed but block 742 finds that the first (uppermost) text line has not, block 752 scrolls upward all the lines above the present cursor position, pushing the first line off the screen. Blocks 760 anticipate future scrolling needs. Block 761 detects whether fewer than two scrollable text lines remain on the screen; these may be two unmodified lines at the bottom of the screen, two at the top, or one at the top and one at the bottom. If fewer than two scrollable lines remain, block 762 sends an AID to CP 110 for an update of document 210. This occurs when block 763 reads the screen back to the document 210. Block 764 then changes the status of all screen lines to "unmodified," so they can be scrolled off the screen if required, without losing any changes made by the operator. Control then passes to blocks 770, and thereafter to blocks 730. The actual screen read will be done by CP 110 at some time after block 762 has been executed; this does not interrupt the operator, who may continue to key in characters.

If blocks 740 detect that both the first and the last display lines have been changed since the screen was displayed, a scroll in either direction would destroy modified data. This can occur if the screen reads done by blocks 760 cannot occur fast enough to provide scrollable line before they are actually needed. This rare case is treated as an error condition by blocks 780. Block 781 sends an AID to CP 110 requesting an immediate screen read. Block 782 signals the operator of an error, and locks the keyboard. (The operator must then press a "Reset" key and reenter the character.)

Control then returns to block 710 to continue character insertion. If the operator presses a function key instead of a character key, exit 711 returns to FIG. 3.

The above embodiment describes the sharing of several functions, block delete, character locate, and continuous insert, in one particular application, a word processor. The DW/36 word processor shares other functions, such as moving and copying blocks of characters, in substantially the same way. The character-locate function is used with other functions besides deletion, and can also be used by itself as a standalone function. Other applications, such a shared-processor database management system, could also use the present invention to share such functions as record searching or updating using the same concepts. The processor organization may also differ from that shown. The I/O processor, for example, could be a physical part of an intelligent terminal. Additional levels of processors could be used to operate on screens, pages, documents, and folders of documents, if desired.

Having described an embodiment thereof, we claim as our invention:

1. A method of performing an interactive task upon a nonexecutable data entity associated with an executable application program, by means of a first central data processor and a second auxiliary data processor, said second auxiliary data processor being connected to an interactive terminal adapted for display to and input from an operator, said method comprising the steps of:

(a) storing said nonexecutable data entity in its entirety in said first central data processor;
(b) transferring a portion of said nonexecutable data entity to said second auxiliary data processor;
(c) displaying at least some of said nonexecutable data entity portion on a display under the control of code located in said second auxiliary data processor;
(d) receiving in said second auxiliary data processor, after step (b), a command input by said operator to perform a predetermined function upon certain data in said nonexecutable data entity for modifying content or location of said certain data;
(e) determining in said second auxiliary data processor whether said function involves only data in said nonexecutable data entity portion located in said second auxiliary data processor;
  (1) if so, performing said function entirely in said second auxiliary data processor, by means of program code which is a part of said executable application program and is permanently located in said second auxiliary data processor, upon said data located in said second auxiliary data processor;
  (2) if not, transferring said command to said first central data processor and performing in said first central data processor a part of the same predetermined function, by means of program code which is a part of said executable application program and is located in said first central data processor, upon said data in the same nonexecutable data entity located in said first central data processor, said part of said same function including modifying the content or location of at least a part of said certain data located in said first central data processor itself.

2. The method of claim 1, wherein said nonexecutable data entity is a text document.

3. The method of claim 2, wherein said executable application program is a word-processing program having code located partly in said central processor and partly in said second auxiliary data processor.

4. The method of claim 1, wherein said application program includes a function for inserting additional data into said data entity at a location designated by said operator.

5. A system for performing an interactive task upon a nonexecutable data entity associated with executable application program, said system comprising:
(a) a central data processor having storage for data and executable code;
(b) a nonexecutable data entity associated with an executable application program, wherein said nonexecutable data entity is stored in its entirety in said central data processor;
(c) first executable code forming a part of said executable application program, stored in said central data processor, for performing entirely within said central data processor an entire function associated with each of a set of predetermined operations for modifying content of said nonexecutable data entity stored in said central data processor;
(d) an auxiliary data processor having storage for data and executable code and having input means for receiving a command from an operator;
(e) means for transferring a portion of said nonexecutable data entity to said auxiliary data processor from said central data processor, and vice versa;
(f) second executable code forming a part of said executable application program, stored in said auxiliary data processor, for performing within said auxiliary data processor the entire function of each of said set of predetermined operations for modifying the content of said nonexecutable data entity portion currently stored in said auxiliary data processor;
(g) an interactive display terminal coupled to said auxiliary data processor for displaying said nonexecutable data entity portion to an operator;
(h) input means coupled to said auxiliary data processor for receiving from said operator a command to perform one operation of said set of predetermined operations upon said nonexecutable data entity;
(i) decision means in said auxiliary data processor for determining whether said one operation can be entirely performed upon said nonexecutable data entity portion already stored in said auxiliary data processor, for invoking said second executable code to modify said nonexecutable data entity portion in said auxiliary data processor if so, and otherwise for transferring said command to said central data processor so as to invoke said first executable code to modify said entire nonexecutable data entity in said central data processor.

6. The system of claim 5 wherein said first executable code executes only in said central data processor, and wherein said second executable code differs substantially from said first executable code and executes only in said auxiliary data processor.

7. The system of claim 5 wherein said central data processor has a first instruction set and said auxiliary data processor has a second instruction set differing from said first instruction set, and wherein said first executable code is adapted to execute in said first instruction set and said second executable code is adapted to execute in said second instruction set.

8. The system of claim 5 wherein said central data processor is a higher-capacity processor for executing user tasks, and wherein said auxiliary data processor is a lower-capacity input/output device controller for controlling said interactive terminal.

9. The system of claim 6 further comprising:
a channel coupled between said central data and said auxiliary data processors, said channel being controlled by said central data processor to transfer said nonexecutable data/entity portion both to and from said auxiliary data processor.

10. The system of claim 5 wherein said one operation comprises modifying as a unit a block of data whose boundaries are designated by said operator at said terminal as a unit additional data, whereby said second executable code causes said auxiliary data processor to modify said data in said nonexecutable data entity portion stored in said auxiliary data processor if said block of data exists in said nonexecutable data entity portion, and said first executable code causes said central data processor to modify said block of data in said entire data item stored in said central data processor otherwise.

11. Apparatus as set forth in claim 5 wherein said nonexecutable data entity is a text document.

12. Apparatus as set forth in claim 11 wherein said executable application program is a word-processing program having code located partly in said central data processor and partly in said auxiliary data processor.

13. A system for performing an interactive task upon a nonexecutable data entity associated with executable application program, said system comprising:
- (a) a central data processor having storage for data and executable code;
- (b) a nonexecutable data entity associated with an executable application program, wherein said nonexecutable data entity is stored in its entirety in said central data processor;
- (c) first executable code forming a part of said executable application program, stored in said central data processor, for performing entirely within said central data processor an entire function associated with each of a set of predetermined operations for modifying content of said nonexecutable data entity stored in said central data processor;
- (d) an auxiliary data processor having storage for data and executable code and having input means for receiving a command from an operator;
- (e) means for transferring a portion of said nonexecutable data entity to said auxiliary data processor from said central data processor, and vice versa;
- (f) second executable code forming a part of said executable application program, stored in said auxiliary data processor, for performing within said auxiliary data processor the entire function of each of said set of predetermined operations for modifying the content of said nonexecutable data entity portion currently stored in said auxiliary data processor;
- (g) an interactive display terminal coupled to said auxiliary data processor for displaying said nonexecutable data entity portion to an operator;
- (h) input means coupled to said auxiliary data processor for receiving from said operator a command to perform one operation of said set of predetermined operations upon said nonexecutable data entity;
- (i) decision means in said auxiliary data processor for determining whether said one operation can be entirely performed upon said nonexecutable data entity portion already stored in said auxiliary data processor, for invoking said second executable code to modify said nonexecutable data entity portion in said auxiliary data processor if so, and otherwise for transferring said command to said central data processor so as to invoke said first executable code to modify at least a part of said nonexecutable data entity located in said central data processor itself.

* * * * *